United States Patent
Duncan et al.

(10) Patent No.: US 7,107,483 B2
(45) Date of Patent: Sep. 12, 2006

(54) APPARATUS AND METHOD FOR ENHANCING DATA AVAILABILITY BY LEVERAGING PRIMARY/BACKUP DATA STORAGE VOLUMES

(75) Inventors: Kurt Duncan, Wichita, KS (US); Robert Stankey, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 530 days.

(21) Appl. No.: 10/295,519

(22) Filed: Nov. 15, 2002

(65) Prior Publication Data

US 2004/0098637 A1    May 20, 2004

(51) Int. Cl.
  *G06F 11/00*    (2006.01)
(52) U.S. Cl. .......................... 714/6; 711/152
(58) Field of Classification Search ............. 714/5, 714/6
  See application file for complete search history.

(56) References Cited

U.S. PATENT DOCUMENTS

| | | | | |
|---|---|---|---|---|
| 4,837,680 A * | 6/1989 | Crockett et al. | ............. | 710/104 |
| 5,212,784 A * | 5/1993 | Sparks | ............. | 714/6 |
| 5,432,922 A * | 7/1995 | Polyzois et al. | ............. | 714/6 |
| 5,787,242 A * | 7/1998 | DeKoning et al. | ............. | 714/5 |
| 5,889,935 A * | 3/1999 | Ofek et al. | ............. | 714/6 |
| 5,933,653 A * | 8/1999 | Ofek | ............. | 710/6 |
| 6,085,333 A * | 7/2000 | DeKoning et al. | ............. | 714/7 |
| 6,173,377 B1 * | 1/2001 | Yanai et al. | ............. | 711/162 |
| 6,182,198 B1 * | 1/2001 | Hubis et al. | ............. | 711/162 |
| 6,304,980 B1 * | 10/2001 | Beardsley et al. | ............. | 714/6 |
| 6,324,654 B1 * | 11/2001 | Wahl et al. | ............. | 714/6 |
| 6,405,294 B1 * | 6/2002 | Hayter | ............. | 711/162 |
| 6,442,706 B1 * | 8/2002 | Wahl et al. | ............. | 714/6 |
| 6,480,970 B1 * | 11/2002 | DeKoning et al. | ............. | 714/6 |
| 6,578,120 B1 * | 6/2003 | Crockett et al. | ............. | 711/162 |
| 6,606,694 B1 * | 8/2003 | Carteau | ............. | 711/162 |
| 6,618,818 B1 * | 9/2003 | Wahl et al. | ............. | 714/6 |
| 6,631,477 B1 * | 10/2003 | LeCrone et al. | ............. | 714/5 |
| 6,643,795 B1 * | 11/2003 | Sicola et al. | ............. | 714/6 |
| 6,654,752 B1 * | 11/2003 | Ofek | ............. | 707/10 |
| 6,671,776 B1 * | 12/2003 | DeKoning | ............. | 711/114 |
| 6,754,682 B1 * | 6/2004 | LeCrone et al. | ............. | 707/204 |
| 6,813,688 B1 * | 11/2004 | Wu et al. | ............. | 711/114 |
| 6,842,825 B1 * | 1/2005 | Geiner et al. | ............. | 711/133 |
| 2002/0026603 A1 * | 2/2002 | LeCrone et al. | ............. | 714/6 |
| 2003/0170012 A1 * | 9/2003 | Cochran | ............. | 386/125 |
| 2003/0217119 A1 * | 11/2003 | Raman et al. | ............. | 709/219 |
| 2004/0034808 A1 * | 2/2004 | Day et al. | ............. | 714/6 |
| 2004/0078638 A1 * | 4/2004 | Cochran | ............. | 714/6 |
| 2004/0098637 A1 * | 5/2004 | Duncan et al. | ............. | 714/6 |
| 2004/0153717 A1 * | 8/2004 | Duncan | ............. | 714/5 |

OTHER PUBLICATIONS

Microsoft Press Computer Dictionary, Third Edition; Microsoft Press; 1997; pp. 297 and 430.*

* cited by examiner

*Primary Examiner*—Scott Baderman
*Assistant Examiner*—Joshua Lohn
(74) *Attorney, Agent, or Firm*—Suiter West Swantz PC LLO

(57) ABSTRACT

An apparatus and method for enhancing data availability by leveraging primary/backup data storage volumes. A Remote Volume Mirroring (RVM) system may be leveraged according to the present invention to provide volume failover by enhancing the functionality of the arrays, in a manner transparent to the host operating system.

18 Claims, 4 Drawing Sheets

APPARATUS AND METHOD FOR ENHANCING DATA AVAILABILITY BY LEVERAGING PRIMARY/BACKUP DATA STORAGE VOLUMES

FIELD OF THE INVENTION

This invention relates generally to the field of storage systems, and particularly to an apparatus and method for enhancing data availability by leveraging primary/backup data storage volumes.

BACKGROUND OF THE INVENTION

Electronic data storage is one of the most important aspects of the modern economy. Almost every aspect of modern life has some element that requires the storage and retrieval of electronic data.

A storage system is an integrated collection of one or more controllers, one or more data storage devices such as disks, CD-ROMs, tapes, media loaders, and the like, and any required control software that provides storage services to a host such as a server on a network, a Web server on the Internet, a mainframe computer, or the like.

While a storage system is an important means to store and retrieve critical data, the physical mechanisms employed in the storage and retrieval process may fail, preventing storage and retrieval of the data. Many programmatic and hardware facilities have been utilized to provide continued access to the data. For example, intra-array data mirroring and conventional RAID techniques, when properly configured, may prevent data loss due to the failure of any single component. However, there are still various failure scenarios which may result in loss of access to data. For example, the failure of multiple components may disrupt access to a given data set, often resulting in permanent data loss.

Currently, methods exist to mirror entire data sets between arrays. If access to a specific data set is disrupted, the mirrored copy may be accessed in its place. Using these methods, however, the host must be reconfigured, either manually or programmatically, to recognize the existence of the data set in a logically different location. Additionally, for various logistical reasons, the host must be prevented from accessing the mirrored data set until it is needed. The process, then, of "failing over" from a non-accessible volume in a primary array to a copy of that volume in a secondary array, generally requires human intervention and may result in temporary loss of access to data. Furthermore, any information cached in the host which has not been written to a disk may be lost, since the host may not be able to retain that cache and apply it to a new logical target. The host simply cannot recognize that the new target is a mirror of the original data set.

Thus, it would be desirable to have an apparatus and method that provide volume failover from one array to another by enhancing the functionality of the arrays, in a manner transparent to the host operating system.

SUMMARY OF THE INVENTION

Accordingly, the present invention is directed to an apparatus and method for enhancing data availability by leveraging primary/backup data storage volumes. According to the present invention, volume failover is accomplished by enhancing the functionality of the arrays, in a manner transparent to the host operating system.

According to a first aspect of the present invention, an exemplary apparatus for enhancing data availability includes a storage device and a host coupled to the storage device. The storage device includes at least one storage system. Additionally, the storage device includes a first volume and a second volume. The host is programmed to identify a first group of logical and physical paths to the first volume, and to identify a second group of logical and physical paths to the second volume, wherein the second volume contains a mirror of data on the first volume. The host is further programmed to complete I/O requests against the second volume when the first volume is not accessible down the first group of logical and physical paths, and when the second volume is accessible down the second group of logical and physical paths.

According to an additional aspect of the present invention, an exemplary computerized method for enhancing data availability includes the following steps: identifying a first group of logical and physical paths to a first volume; identifying a second group of logical and physical paths to a second volume, wherein the second volume contains a mirror of data on the first volume; and completing I/O requests against the second volume when the first volume is not accessible down the first group of logical and physical paths, and when the second volume is accessible down the second group of logical and physical paths.

According to a further aspect of the present invention, an exemplary computerized method for enhancing data availability includes the following steps: identifying a first group of logical and physical paths to a first volume; identifying a second group of logical and physical paths to a second volume, wherein the second volume contains a mirror of data on the first volume; and completing I/O requests against the second volume when the first volume is demoted by a third party, and when the second volume is accessible down the second group of logical and physical paths.

According to a still further aspect of the present invention, an exemplary computerized method for enhancing data availability includes the following steps: identifying a first group of logical and physical paths to a first volume; identifying a second group of logical and physical paths to a second volume, wherein the second volume contains a mirror of data on the first volume; and routing read requests across the first and second groups of logical and physical paths when the first volume is accessible down the first group of logical and physical paths, and when the second volume is in a read-only mode and accessible down the second group of logical and physical paths.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
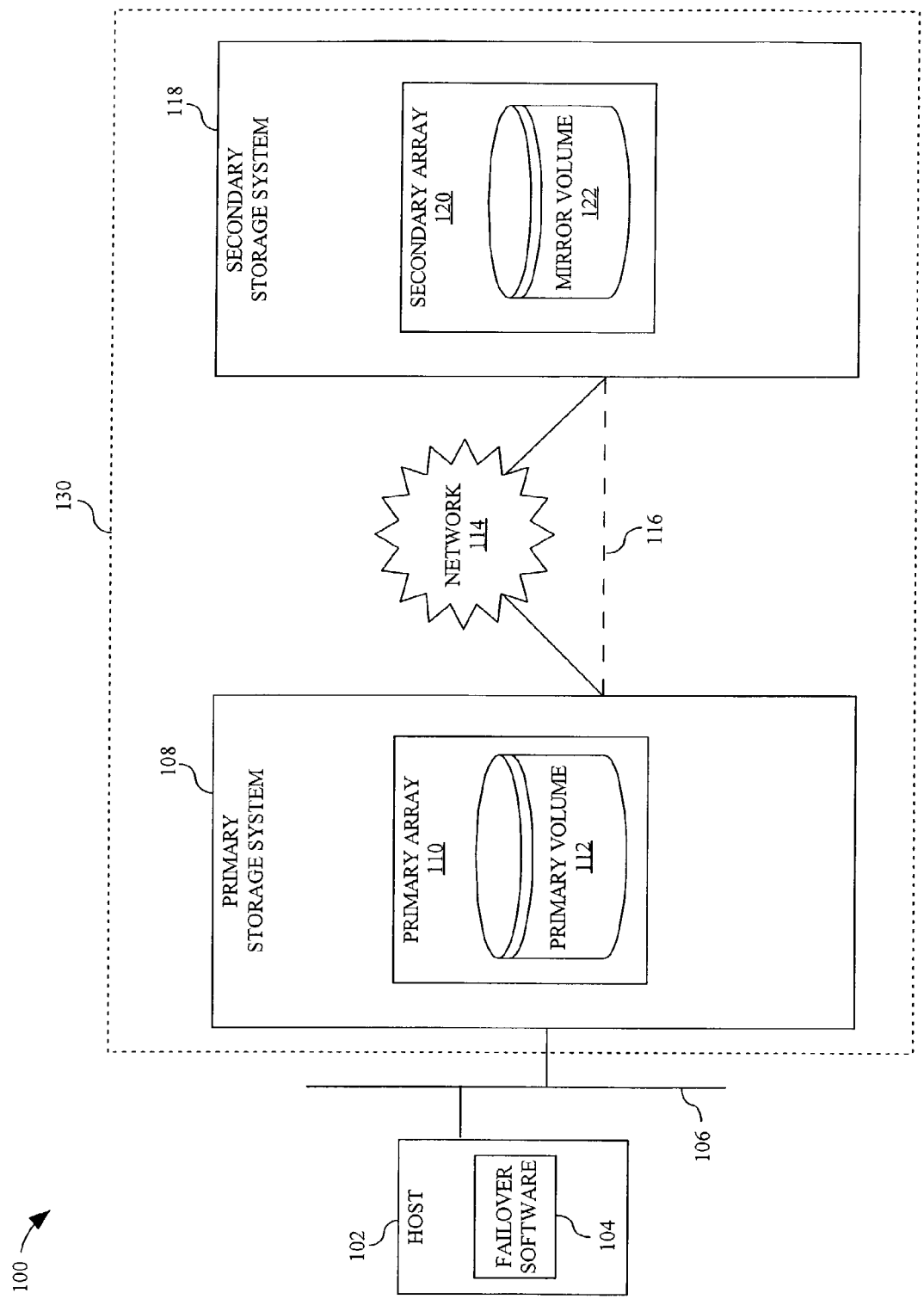
FIG. 1 is a schematic diagram of an exemplary data processing system in which the present invention may be implemented.

Referring first to FIG. 1, a schematic diagram of an exemplary data processing system 100 in which the present invention may be implemented is shown. The data processing system 100 includes a storage device 130 and a host 102. The storage device 130 may include a primary storage system 108 and at least one secondary storage system 118. The primary storage system 108 and the secondary storage system 118 are both connected to a network 114. The primary storage system 108 may include at least one primary array 110, which may host at least one primary volume 112. The secondary storage system 118 may include at least one secondary array 120, which may host at least one mirror volume 122.

The host 102 may take various forms, such as a server on a network, a Web server on the Internet, a mainframe computer, and the like. The host 102 may include failover software 104 and be connected to the primary storage system 108 via an interface bus 106. The failover software 104 may be installed on the host 102, or may be hosted by the host 102 through a computer-readable medium, which may include any kind of computer memory such as floppy disks, conventional hard disks, CD-ROMS, Flash ROMS, nonvolatile ROM, RAM, and the like.

Data may be stored by the host 102 in the primary storage system 108. Data written to the primary storage system 108 are copied to the secondary storage system 118. For example, the mirror volume 122 may contain a mirror of data on the primary volume 112. The copying process may be accomplished by the approach of Remote Volume Mirroring (RVM). A RVM system may be implemented both locally and remotely so that data generated locally (e.g., inside the primary storage system 108) by execution of an application program is additionally communicated over a network to a remote location (e.g., the secondary storage system 118) for replication. Typically, RVM enables recovery of the local computer system in the event of a temporary outage or, alternatively, transfer of data processing operations to a remote computer system if the local computer system is not able to recover, the outage is for a prolonged period of time, or a disaster permanently disables the local computer system. A RVM system may be operable in one of several modes, including a synchronous mode, an asynchronous mode, a near synchronous mode, and the like.

The primary storage system 108 and the secondary storage system 118 are disk systems in these examples. Specifically, the primary storage system 108 and the secondary storage system 118 are each set up as shared virtual arrays to increase the flexibility and manageability of data stored within these systems. It is understood that the primary storage system 108 and the secondary storage system 118 may be configured as tape systems or the like. The network 114 may take various forms, such as a local area network (LAN), a wide area network (WAN), the Internet, an intranet, and the like. The network 114 may contain various links, including fiber optic links, packet switched communication links, enterprise systems connection (ESCON) fibers, SCSI cable, wireless communication links, and the like. The interface bus 106 may be any of several standard industry interface buses, including SCSI, Ethernet (LAN), Token Ring (LAN), and the like.

FIG. 1 is intended as an example of a data processing system in which the present invention may be implemented and not as an architectural limitation to the present invention. Those of ordinary skill in the art will appreciate that various combinations and arrangements may be employed without departing from the scope and spirit of the present invention. For example, an alternative embodiment of the storage device 130 may include a single storage system which includes both the primary array 110, which hosts the primary volume 112, and the secondary array 120, which hosts the mirror volume 122. Additionally, The host 102 and the primary storage system 108 may both have a connection to a network, while the primary storage system 108 and the secondary storage system 118 may be connected by a LAN or WAN. Furthermore, the primary storage system 108 and the secondary storage system 118 may be connected to each other by a direct connection 116, rather than through the network 114. Moreover, the host 102 and the primary storage system 108 may be coupled through wireless communication or by a direct connection rather than via the interface bus 106.

According to the present invention, the failover software 104 is capable of identifying multiple logical and physical paths to a single data set, a primary volume, or a mirror volume, and presenting these various paths as one storage entity to the host 102. The failover software 104 is also capable of routing I/O among the various paths as necessary, in order to complete the various I/O requests. Since the host 102 includes the failover software 104, the host 102 may be programmed to identify all available logical and physical paths ("a first group of logical and physical paths") to the primary volume 112, and to identify all available logical and physical paths ("a second group of logical and physical paths") to the mirror volume 122, which contains a mirror of data on the primary volume 112.

According to one aspect of the present invention, if the primary volume 112 is accessible down the first group of logical and physical paths, the failover software 104 completes I/O requests against the primary volume 112. If the primary volume 112 becomes inaccessible due to path, volume, or array failure, or for other reasons, the failover software 104 may check whether the mirror volume 122 is accessible down the second group of logical and physical paths. If the mirror volume 122 is not accessible, the host 102 cannot perform I/O to the data set. If the mirror volume 122 is accessible, the failover software 104 completes I/O requests against the mirror volume 122.

According to an additional aspect of the present invention, if the primary volume 112 is demoted to a secondary status by a third party such as an operator, a robot, or the like, the failover software 104 completes I/O requests against the mirror volume 122 when the mirror volume 122 is accessible.

According to a further aspect of the present invention, if the mirror volume 122 is allowed to go into a read-only mode (i.e., write requests are blocked), the host 102 may be programmed to route read requests across all available logical and physical paths, including the first group of logical and physical paths to the primary volume 112 and the second group of logical and physical paths to the mirror volume 122. This feature may provide a mechanism for distributing I/O load against a given data set across multiple arrays, thus significantly increasing throughput, especially for read-intensive I/O.

Figure 2:
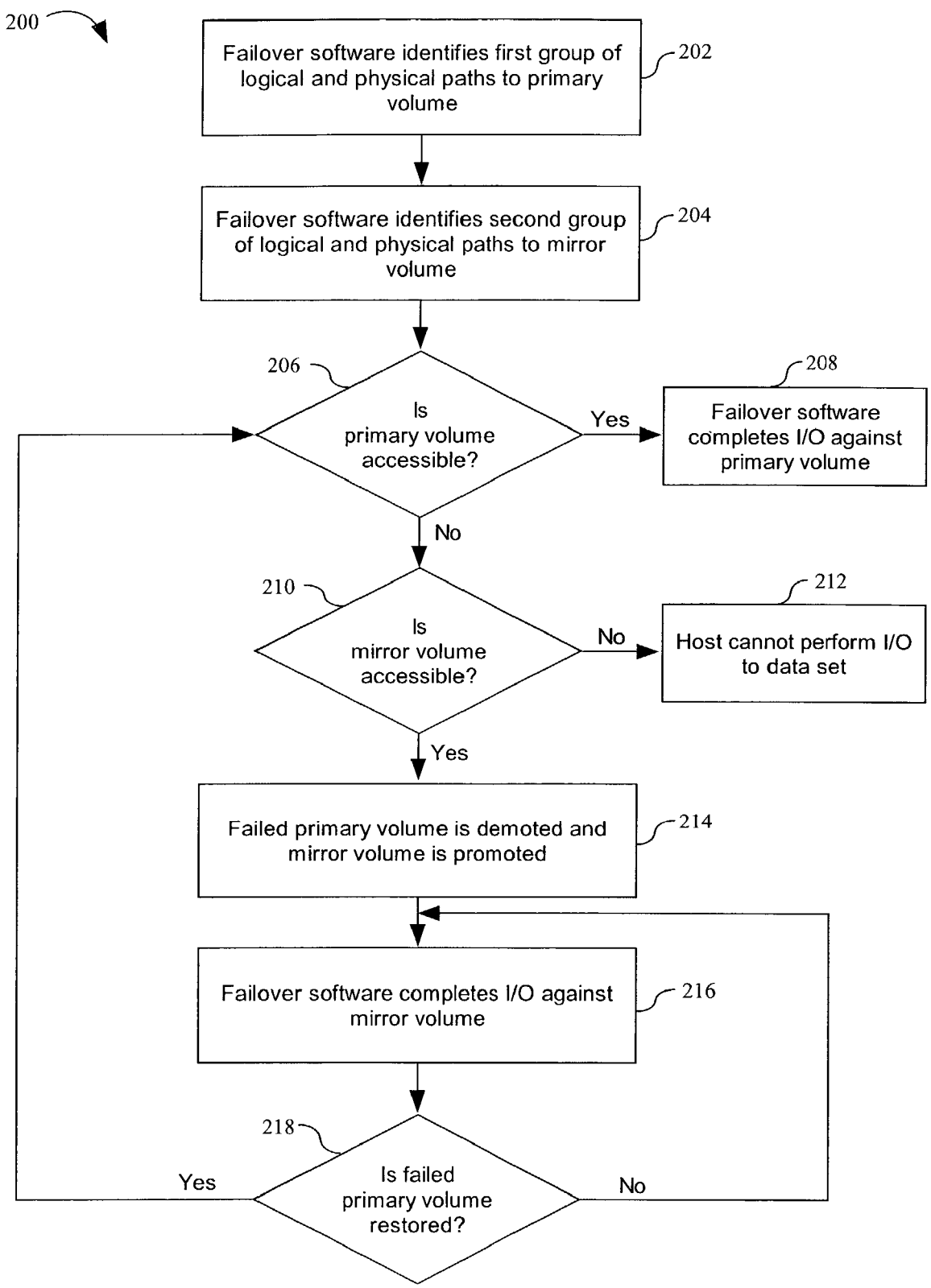
FIG. 2 is a flow chart of an exemplary process used for leveraging primary/backup data storage volumes in accordance the present invention.
Figure 3:
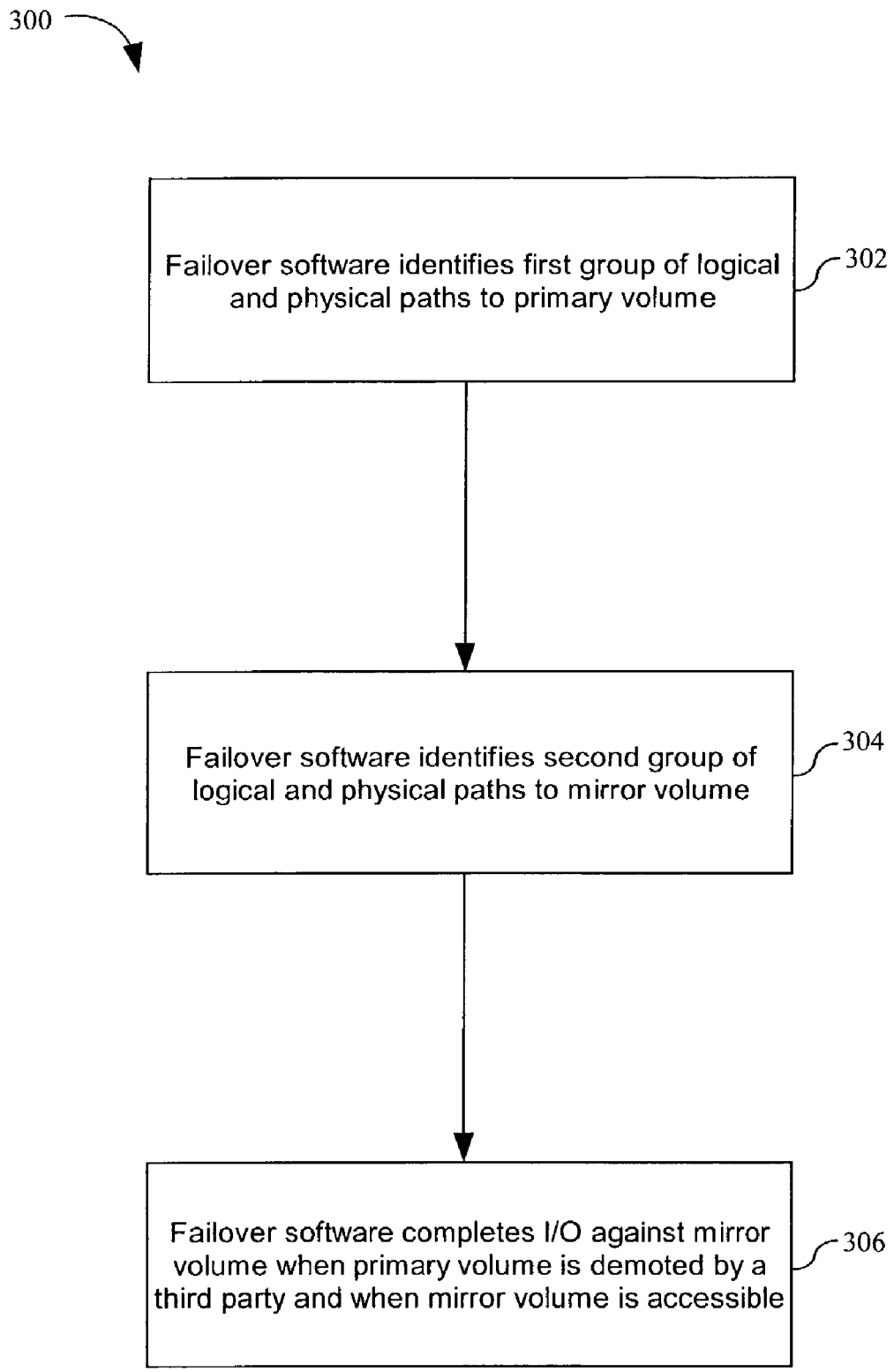
FIG. 3 is a flow chart of an additional exemplary process used for leveraging primary/backup data storage volumes in accordance the present invention.
Figure 4:
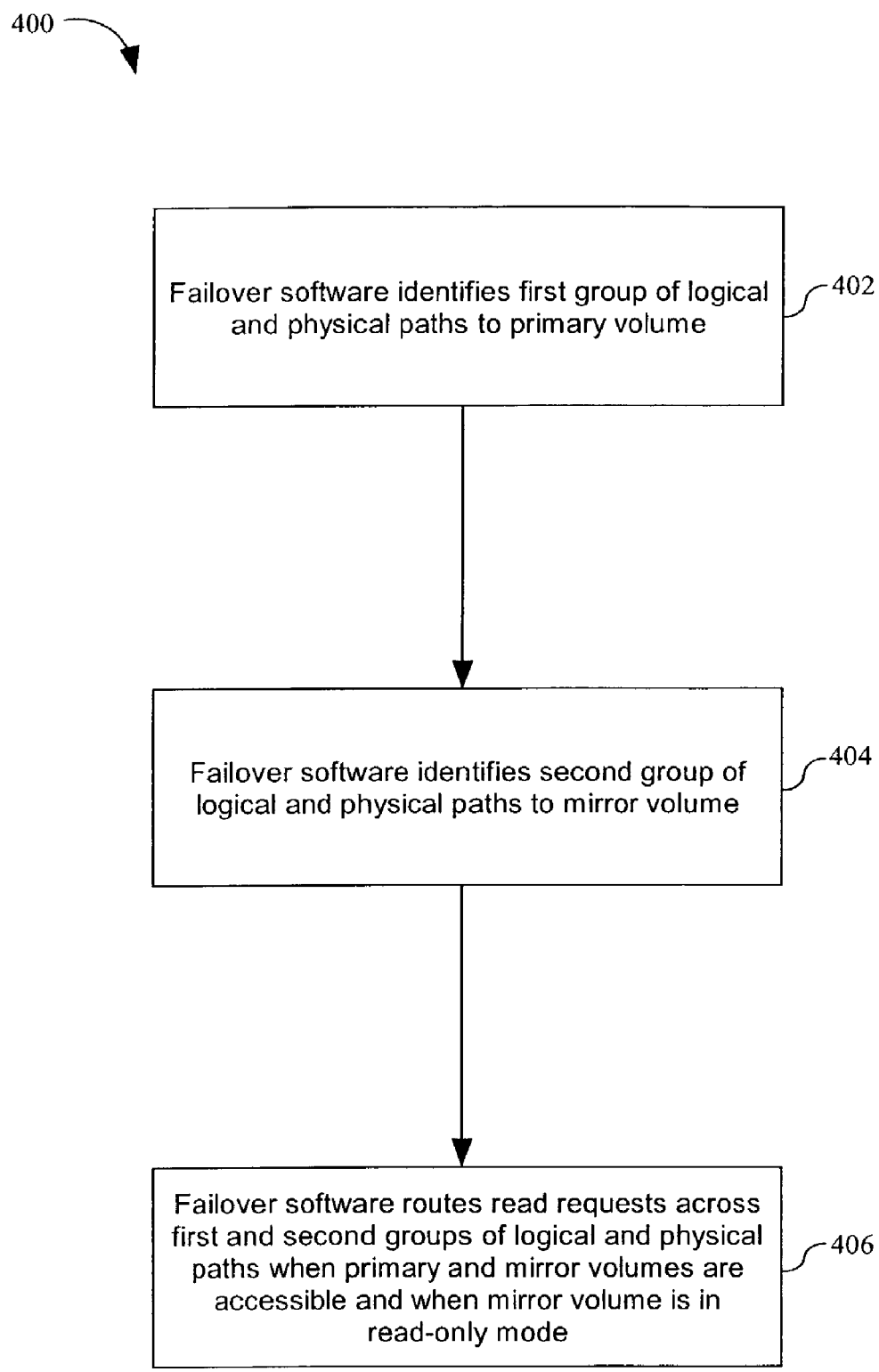
FIG. 4 is a flow chart of a further exemplary process used for leveraging primary/backup data storage volumes in accordance the present invention.

Referring generally now to FIGS. 2 through 4, exemplary processes utilized for leveraging primary/backup data storage volumes in accordance with the present invention are shown. A typical RVM model may be used as an example to show how to implement the present invention. In this model, a primary storage system includes a primary array that hosts a primary volume, to which normal host I/O activity is allowed. A secondary storage system includes a secondary array that hosts a mirror volume, to which normal host I/O is prevented. The primary and secondary arrays inter-communicate data and status information to bring the mirror volume to a state in which it contains a mirror of the data on the primary volume, and then maintain that state, assuming the interconnection remains viable. The primary and mirror volumes are maintained in a synchronous mode by their respective storage systems, and data transfers occur at Fibre Channel speeds. The model allows synchronous mirroring of critical data for disaster recovery, provides one or more copies of data through replication to protect against loss of data, and utilizes cross-mirroring between storage systems to protect both storage systems.

According to the present invention, a host hosts failover software, which is capable of identifying multiple logical and physical paths to a single data set, a primary volume, or a mirror volume, and presenting these various paths as one storage entity to the host. All available logical and physical paths to a primary volume are defined as a first group of logical and physical paths. And all available logical and physical paths to a mirror volume, which contains a mirror of data on the primary volume, are defined as a second group of logical and physical paths. The failover software is also capable of routing I/O among the various paths as necessary, in order to complete the various I/O requests.

Referring to FIG. 2, a flow chart of an exemplary process 200 used for leveraging primary/backup data storage volumes in accordance the present invention is shown. The process 200 starts with the step in which the failover software identifies a first group of logical and physical paths to a primary volume 202. The failover software also identifies a second group of logical and physical paths to a mirror volume, which contains a mirror of data on the primary volume 204. Next, the failover software checks whether the primary volume is accessible 206. If the primary volume is accessible down the first group of logical and physical paths, the failover software completes I/O requests against the primary volume 208. If the primary volume becomes inaccessible due to path, volume, or array failure, or for some other reasons, the failover software may check whether the mirror volume is accessible down the second group of logical and physical paths 210. If the mirror volume is not accessible, the host cannot perform I/O to the data set 212. If the mirror volume is accessible, the failed primary volume is demoted to a secondary status and the mirror volume is promoted to a primary status 214. Next, the failover software completes I/O requests against the mirror volume 216.

The status of the failed primary volume may then be checked 218. If the problem which resulted in the failed primary volume is not corrected and the failed primary volume is therefore not restored, the process 200 returns to Step 216. If the problem which resulted in the failed primary volume is corrected, the failed primary volume may be restored using existing mirroring facilities. After the failed primary volume is restored, the process 200 returns to Step 206.

FIG. 3 is a flow chart of an additional exemplary process 300 used for leveraging primary/backup data storage volumes in accordance the present invention. The process 300 starts with the step in which the failover software identifies a first group of logical and physical paths to a primary volume 302. The failover software also identifies a second group of logical and physical paths to a mirror volume, which contains a mirror of data on the primary volume 304. If the primary volume is demoted to a secondary status by a third party such as an operator, a robot, or the like, the failover software completes I/O requests against the mirror volume when the mirror volume is accessible 306.

FIG. 4 is a flow chart of a further exemplary process 400 used for leveraging primary/backup data storage volumes in accordance the present invention. The process 400 starts with the step in which the failover software identifies a first group of logical and physical paths to a primary volume 402. The failover software also identifies a second group of logical and physical paths to a mirror volume, which contains a mirror of data on the primary volume 404. Next, in Step 406, if the mirror volume is in a read-only mode (i.e., write requests are blocked), the failover software may route read requests across all available logical and physical paths, including the first group of logical and physical paths to the primary volume and the second group of logical and physical paths to the mirror volume, thus providing, across multiple arrays, a mechanism for distributing I/O load against a given data set. For read-intensive I/O, this feature may provide a significant increase in throughput.

It is understood that the typical RVM model described along with FIGS. 2 through 4 is used only as an example to show how the present invention is implemented and not as an architectural limitation to the present invention. Those of ordinary skill in the art will understand that other approaches may be used without departing from the scope and spirit of the present invention. For example, RVM systems may be operable in an asynchronous mode, a near synchronous mode, or the like. Moreover, the primary volume and the mirror volume may be hosted by a single storage system. Furthermore, the present invention may be implemented in a storage device that includes two or more mirror volumes.

It is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

The present invention works transparently to the host operating system, avoiding the necessity of reconfiguring or rebooting the host in order to regain access to a data set when a primary volume containing the data set is not accessible, and thereby avoiding the distinct possibility of data loss as dirty cache buffers are abandoned.

The present invention also has many other advantages. For example, the present invention works in conjunction with the RVM feature: people may enjoy the benefits of RVM as well as gaining the benefits of the present invention, without investing in any additional hardware or facilities. Thus, the present invention may leverage currently-existing features to provide concrete benefits for incremental effort. Additionally, the present invention provides backup/recovery mechanisms, which do not present the problems normally associated with presentation of mirrors of data sets at multiple logical port addresses, since the host always sees one single target, regardless of the state of the various volumes.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A computerized method for enhancing data availability, comprising:
    identifying, by failover software hosted by a host, a first group of logical and physical paths to a first volume;
    identifying, by said failover software, a second group of logical and physical paths to a second volume, said second volume containing a mirror of data on said first volume; and
    completing, by said failover software, I/O requests against said first volume and preventing said second volume from being accessed down said second group of logical and physical paths when said first volume is accessible down said first group of logical and physical paths,
    wherein the failover software is configured for presenting the identified first group of logical and physical paths and the identified second group of logical and physical paths to the host as a single storage entity.

2. The computerized method of claim 1, further comprising completing, by said failover software, said I/O requests against said second volume when said first volume is not accessible down said first group of logical and physical paths, and when said second volume is accessible down said second group of logical and physical paths.

3. The computerized method of claim 2, further comprising completing, by said failover software, said I/O requests against said first volume when said first volume is restored and accessible after said first volume is not accessible.

4. The computerized method of claim 1, further comprising completing, by said failover software, said I/O requests against said second volume when said first volume is demoted by a third party, and when said second volume is accessible down said second group of logical and physical paths.

5. A computerized method for enhancing data availability, comprising:
    identifying, by failover software hosted by a host, a first group of logical and physical paths to a first volume;
    identifying, by said failover software, a second group of logical and physical paths to a second volume, said second volume containing a mirror of data on said first volume; and
    routing, by said failover software, read requests across said first group and said second group of logical and physical paths when said first volume is accessible down said first group of logical and physical paths, and when said second volume is accessible down said second group of logical and physical paths,
    wherein the failover software is configured for presenting the identified first group of logical and physical paths and the identified second group of logical and physical paths to the host as a single storage entity.

6. An apparatus for enhancing data availability, comprising:
    means for identifying, by failover software hosted by a host, a first group of logical and physical paths to a first volume;
    means for identifying, by said failover software, a second group of logical and physical paths to a second volume, said second volume containing a mirror of data on said first volume; and means for completing, by said failover software, I/O requests against said first volume and preventing said second volume from being accessed down said second group of logical and physical paths when said first volume is accessible down said first group of logical and physical paths,
    wherein the failover software is configured for presenting the identified first group of logical and physical paths and the identified second group of logical and physical paths to the host as a single storage entity.

7. The apparatus of claim 6, further comprising means for completing, by said failover software, said I/O requests against said second volume when said first volume is not accessible down said first group of logical and physical paths, and when said second volume is accessible down said second group of logical and physical paths.

8. The apparatus of claim 7, further comprising means for completing, by said failover software, said I/O requests against said first volume when said first, volume is restored and accessible after said first volume is not accessible.

9. The apparatus of claim 6, further comprising means for completing, by said failover software, I/O requests against said second volume when said first volume is demoted by a third party, and when said second volume is accessible down said second group of logical and physical paths.

10. An apparatus for enhancing data availability, comprising:
    a storage device having at least one storage system, said storage device including a first volume and a second volume; and
    a host coupled to said storage device, said host being programmed by failover software hosted by said host to:
        identify a first group of logical and physical paths to said first volume;
        identify a second group of logical and physical paths to a second volume, said second volume containing a mirror of data on said first volume; and
        complete I/O requests against said first volume and prevent said second volume from being accessed down said second group of logical and physical paths when said first volume is accessible down said first group of logical and physical paths,
    wherein the failover software is configured for presenting the identified first group of logical and physical paths and the identified second group of logical and physical paths to the host as a single storage entity.

11. The apparatus of claim 10, wherein said host is further programmed by said failover software to complete said I/O requests against said second volume when said first volume is not accessible down said first group of logical and physical paths, and when said second volume is accessible down said second group of logical and physical paths.

12. The apparatus of claim 11, wherein said host is further programmed by said failover software to complete said I/O requests against said first volume when said first volume is restored and accessible after said first volume is not accessible.

13. The apparatus of claim 10, wherein said host is further programmed by said failover software to complete said I/O requests against said second volume when said first volume is demoted by a third party, and when said second volume is accessible down said second group of logical and physical paths.

14. The apparatus of claim 10, wherein said host is a server on a network.

15. The apparatus of claim 10, wherein said host is a Web server on Internet.

16. The apparatus of claim 10, wherein said host is a mainframe computer.

17. The apparatus of claim 10, wherein said first volume and said second volume are in a single storage system of said storage device.

18. The apparatus of claim 10, wherein said first volume and said second volume are in different storage systems of said storage device.

\* \* \* \* \*